Dec. 16, 1924.
A. N. PASMAN
FLUSH TANK FITTING
Filed Dec. 6, 1921
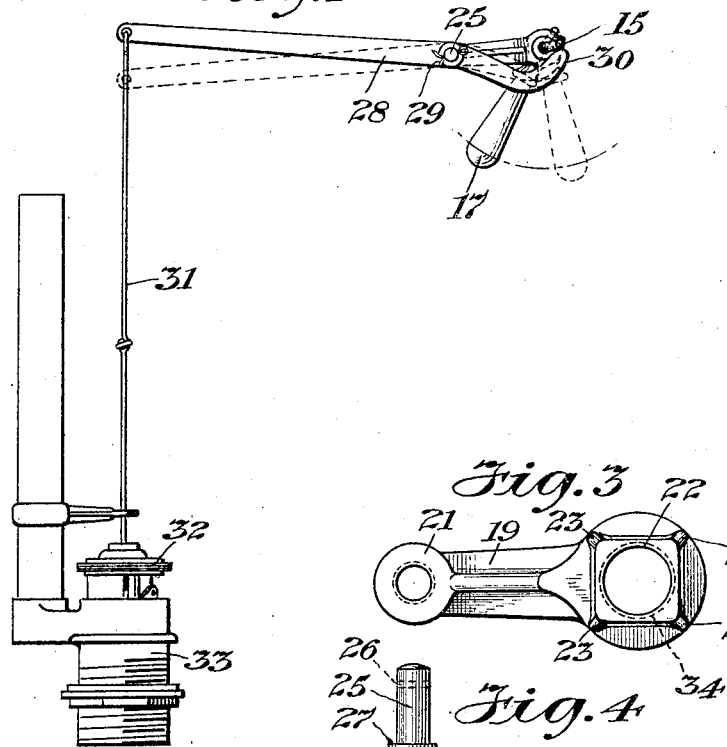
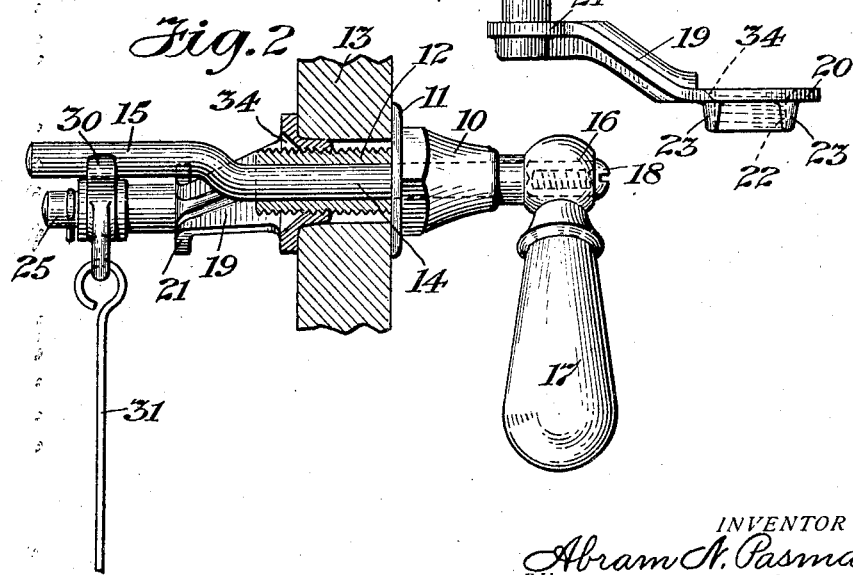
INVENTOR
Abram N. Pasman
BY
HIS ATTORNEYS Patented Dec. 16, 1924.

1,519,796

UNITED STATES PATENT OFFICE.

ABRAM N. PASMAN, OF WATERBURY, CONNECTICUT.

FLUSH-TANK FITTING.

Application filed December 6, 1921. Serial No. 520,211.

*To all whom it may concern:*

Be it known that I, ABRAM N. PASMAN, a citizen of the United States, residing at Waterbury, in the county of New Haven and State of Connecticut, have invented an Improvement in Flush-Tank Fittings, of which the following is a specification.

My present invention relates to a flush tank fitting and more particularly to that type of fitting which includes a revoluble handle and devices associated therewith for operating the valve of a flush tank. I am aware that heretofore fittings of this particular type have been so constructed as to include stud and socket members connected to the wall of a tank, together with a slip joint or telescoping shaft connected to the handle and actuated thereby to operate a crank and a link for operating the plunger rod of the valve member employed to control the inlet and outlet of the water or other liquid employed in a flush tank. The object of my invention is to simplify this construction by eliminating the telescoping or slip joint shaft and the crank and link employed to operate the lever which controls the flush valve mechanism as well as to provide a fitting which may be connected to the wall of a flush tank in such a manner as to engage the same in a tight and permanently connected condition, as will be hereinafter more particularly described.

In the drawing:

Fig. 1 is a side elevation of the devices comprising my present invention, including a view of the valve of a flush tank operated thereby.

Fig. 2 is an enlarged sectional elevation.

Fig. 3 is a side elevation of the bracket forming part of my improved fitting, and Fig. 4 is a plan of the same.

Referring particularly to the drawing, the fitting made in accordance with my invention preferably comprises a head 10 made in any suitable configuration and preferably provided with a flange 11. Extending from the head 10 is a screw threaded shank or stud 12 and this is adapted to pass through an opening provided therefor in a wall 13 of a flush tank so as to assume the position clearly illustrated in Fig. 2 in which the flange 11 lies against the outer face of the wall of the tank and completely covers the opening therein. In the head 10 and the shank 12 there is a bore in which a spindle or shaft 14 passes. At its inner end this shaft 14 is offset so as to be provided with an eccentric extremity 15, while the opposite end of the shaft 14 is preferably square in cross section as indicated at 16 so as to receive a handle 17 which is secured in position thereon by means of a screw 18 or otherwise.

My improved fitting also includes a bracket indicated at 19. The ends of the bracket, are offset and preferably made to lie in planes which are parallel to each other. The end 20 of the bracket is fitted on one face thereof with bosses 23 tapered on their outer surfaces as indicated in Figs. 3 and 4 so as to fit within the corners of the opening in the wall of the tank and to be tightly secured in place by the screw threaded shank engaging in the tapped opening 22 in this end of the bracket. In the manufacture of the flush tanks to which my improved fitting is particularly applicable, the holes made in the wall for these fittings are usually square and as it is impossible to make these holes of uniform area difficulty has heretofore been experienced in securing the fitting tightly in position. However, as will be apparent, in the construction of the bracket as hereinbefore described this difficulty will be overcome.

The other end 21 of the bracket 19 is fitted with a pin 24 having a reduced end 25 in which there is a transverse bore or hole 26, the reduced end of the pin providing a shoulder 27 between the same and the larger portion thereof which is connected to or made integral with the end 21 of the bracket. Pivotally mounted on the reduced end 25 of this pin the control lever 28 is mounted and maintained thereon by means of a cotter pin 29 or other means passing through the bore 26 in the reduced end of the pin. One end of the lever 28 is curved into the form of a hook as indicated at 30 and adapted to be engaged by the eccentric or offset end 15 of the spindle 14, while connected to the opposite end of the lever 28 is the rod 31 for operating the valve 32 of the flush valve fitting 33 which controls the inlet and outlet of the water to the flush tank.

In the operation of this apparatus, as will now be apparent, the normal position of the lever 28 is shown in the dotted line position, Fig. 1, in which the eccentric or offset end 15 of the spindle is maintained in the curved portion of the upper surface of the hooked end of the lever. By turning the handle the offset or eccentric end thereof engages the curved surface at the hooked end of the lever, depressing the same and raising the opposite end of the lever to lift the rod 31 and raise the valve 32, the parts returning by gravity to their initial or normal positions when the handle is released by the operator. In addition to the simplicity of construction and the possibility of properly and securely adjusting the parts to place in the flush valve tank, my improved fitting also has the advantage of making it possible to completely turn the handle without causing injury to the fitting whereby the danger of moving the handle too far or forcing the same in the operation of the fitting and the flush tank controlled thereby is entirely eliminated.

Furthermore, it will be observed that the outer face of the end 20 of the bracket is recessed as indicated at 34. This makes it possible to place the bracket in position in the tank in the assembling of the parts and then to pass the offset end of the spindle through the hole in the end of the bracket before the screw thread of the shank member 12 engages the screw thread in the end of the bracket, the recess 34 being so formed as to make this possible. The use of clamp bolts and the like heretofore employed in securing the fixture in the wall of the tank are therefore eliminated.

I claim as my invention:

1. A fitting for operating flush valves comprising a stud and socket device adapted to be attached to the wall of a flush tank, a lever for actuating the flush valve, and a spindle passing through and journalled in the said stud member and having an integral offset inner end adapted to engage the said lever to actuate the same, the socket member being provided with a recess in the outer face thereof, whereby the offset end of the spindle may be passed through the said socket member before the stud engages the said socket member.

2. A fitting for operating flush valves comprising a stud member adapted to bear against the outer end of a flush tank and to pass through an opening in the same, a socket member having a recess in its outer face and adapted at a portion of its inner face to bear against the inner surface of the wall of a flush tank and to be engaged by the stud member to secure these parts in position in the wall of the flush tank, a lever for actuating the flush valve, and a spindle passing through and journaled in a bearing provided therefor in the said stud member and having an integral offset inner end which may pass through the socket member because of the said recess therein, the said offset inner end of the spindle being adapted to directly engage the said lever to operate the same.

Signed by me this ninth day of November, 1921.

ABRAM N. PASMAN.